United States Patent
MacDonald et al.

(10) Patent No.: US 9,491,582 B2
(45) Date of Patent: Nov. 8, 2016

(54) METHOD FOR OPTIMIZING BATTERY USE IN A MOBILE DEVICE WHILE TRACKING A LOCATION OF THE DEVICE

(71) Applicant: PING4 INC., Nashua, NH (US)

(72) Inventors: Rindress MacDonald, Hollis, NH (US); Tatsuki Nakano, Nashua, NH (US); Sett Paing Oo, Nashua, NH (US); Dan Post, Tewksbury, MA (US); Sean Roy, Stratham, NH (US); Mohamed Fadlalla, Manchester, NH (US); Mark Sexton, Merrimack, NH (US)

(73) Assignee: Ping4, Inc., Nashua, NH (US)

( * ) Notice: Subject to any disclaimer, the term of this patent is extended or adjusted under 35 U.S.C. 154(b) by 22 days.

(21) Appl. No.: 14/616,400

(22) Filed: Feb. 6, 2015

(65) Prior Publication Data

US 2016/0234647 A1    Aug. 11, 2016

(51) Int. Cl.
*H04W 4/02* (2009.01)
*H04W 72/04* (2009.01)
*H04W 52/02* (2009.01)

(52) U.S. Cl.
CPC ......... *H04W 4/027* (2013.01); *H04W 52/0251* (2013.01); *H04W 72/048* (2013.01)

(58) Field of Classification Search
CPC ........... H04W 4/027; H04W 52/0251; H04W 72/048
See application file for complete search history.

(56) References Cited

U.S. PATENT DOCUMENTS

| | | | | |
|---|---|---|---|---|
| 8,199,001 B2* | 6/2012 | Verbil | ................... | G01C 21/26 340/539.13 |
| 2005/0096065 A1* | 5/2005 | Fleischman | ....... | H04L 29/12028 455/456.1 |
| 2006/0293066 A1* | 12/2006 | Edge | ..................... | H04W 4/02 455/456.3 |
| 2007/0281716 A1* | 12/2007 | Altman | ............... | H04L 12/5865 455/466 |
| 2009/0153401 A1* | 6/2009 | Eitan | ..................... | G01S 19/34 342/450 |
| 2010/0199098 A1* | 8/2010 | King | .................... | G06F 21/6254 713/182 |
| 2010/0246467 A1* | 9/2010 | Song | ..................... | H04W 60/04 370/312 |
| 2012/0258734 A1* | 10/2012 | Takahashi | ......... | H04M 1/72572 455/456.1 |
| 2013/0012234 A1* | 1/2013 | Tufty | .................... | H04W 4/028 455/456.3 |
| 2013/0040600 A1* | 2/2013 | Reitnour | ................ | G01S 19/17 455/404.2 |
| 2013/0184010 A1* | 7/2013 | Lagnado | ................ | G01C 21/20 455/456.2 |
| 2013/0244686 A1* | 9/2013 | Saha | ..................... | G06F 1/3206 455/456.1 |
| 2013/0336287 A1* | 12/2013 | Abraham | .......... | H04W 36/0061 370/331 |
| 2014/0128057 A1* | 5/2014 | Siomina | ................ | H04J 3/0685 455/423 |
| 2014/0274136 A1* | 9/2014 | Edge | ..................... | H04W 4/04 455/456.2 |
| 2016/0088564 A1* | 3/2016 | Ahmadzadeh | .... | H04W 52/0254 455/405 |
| 2016/0105765 A1* | 4/2016 | Farley | .................... | H04W 4/02 455/456.1 |

* cited by examiner

Primary Examiner — Nathan Mitchell
(74) Attorney, Agent, or Firm — Arent Fox LLP (57) ABSTRACT

A method, apparatus, and computer program product for reducing battery consumption while tracking a location of a mobile device. A location tracking application at the mobile device registers to receive location updates from the mobile device. The application receives a location update from the mobile device and determines whether to transmit location information from the received location update to a remote web server.

26 Claims, 6 Drawing Sheets

METHOD FOR OPTIMIZING BATTERY USE IN A MOBILE DEVICE WHILE TRACKING A LOCATION OF THE DEVICE

BACKGROUND

1. Field

Aspects of the present disclosure relate generally to location services of mobile devices, and more particularly, to reducing battery consumption on mobile devices caused by such location services being used to track the location of mobile devices.

2. Description of the Related Art

The cell phone market is transitioning from 'feature' phones to 'smart' phones. Feature phones primarily allow phone calls and text messages. Smart phones allow the functionality of a laptop computer in a phone. Smart phones can connect to the internet either over the cellular network or by using WiFi connectivity. Smart phones can run small software applications known as "apps." Smart phones can be aware of the phone location through the use of a Global Positioning System (GPS) chip, cell phone tower triangulation, or a WiFi network location mapping.

Certain applications track the location of the smart phone through the use of some or all of the methodologies available to the phone. Navigation software applications are an example of one class of applications that track the location of the phone with high precision in order to be able to provide detailed turn by turn navigation instructions. However, navigation applications also consume a corresponding large amount of the available battery power.

SUMMARY

In an aspect of the disclosure, a method, mobile device, mobile device application, and computer program product are presented that are capable of tracking the location of a device with precision while consuming very little of the battery of the mobile device.

For example, the application may track the location of the device with enough precision to deliver location-based messages to areas the size of a building. The location-based message might include public safety warnings, amber alerts, weather alerts, store coupons, or other retail messaging.

The application, for example may include adaptive, self-learning algorithms to maintain an accurate location of a device while reducing the battery usage of the mobile device caused by the application. These algorithms may involve detecting when the phone has not moved 'much' and therefore not requesting location updates and not communicating with the server until the phone movement has been deemed to be significant. Location updates from the mobile device's Operating System (OS) can have a high degree of inaccuracy. Therefore, the application may employ logic to determine whether the current location is more reliable than the new location. If not, the newer location may be ignored. At times, the mobile OS can deliver a location that has moved an impossible amount of distance in an incredibly short time (i.e. from Massachusetts to Texas and back in 20 minutes). The application may employ logic to determine whether the new update is physically possible and ignore it, if it is not possible. As a mobile device moves indoors, these algorithms may include the ability to use additional available methods to learn and improve the indoor location of the phone.

Additional advantages and novel features of aspects of the present invention will be set forth in part in the description that follows, and in part will become more apparent to those skilled in the art upon examination of the following or upon learning by practice thereof.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of optimizing battery use in a mobile device while tracking a location of the device will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

Figure 1:
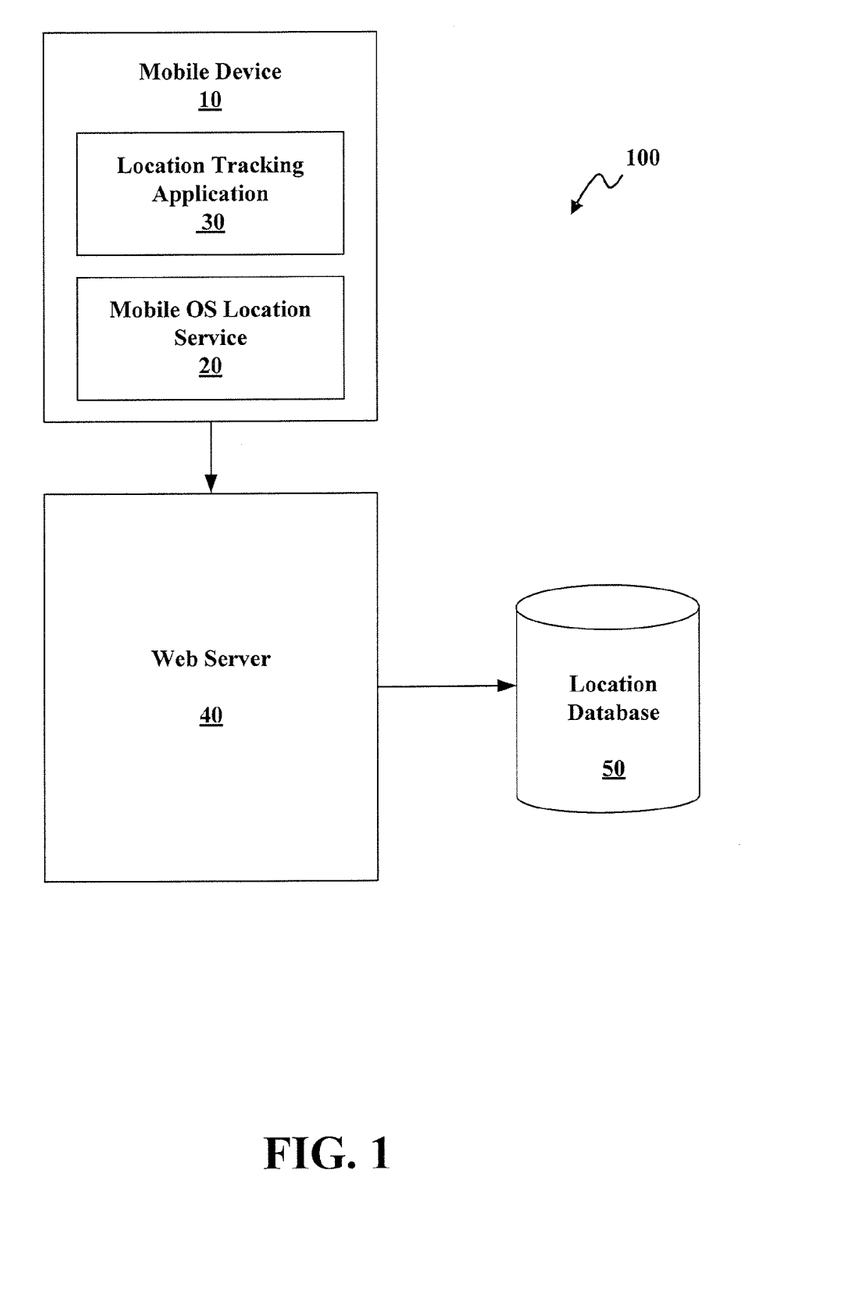
FIG. 1 is a diagram illustrating an example of system components, in accordance with aspects of the present disclosure.

FIG. 1 is a diagram illustrating an example system 100 for tracking the location of a mobile device, in accordance with aspects presented herein. The system includes a mobile device 10. Examples of mobile devices 10 include a cellular phone, a smart phone, a laptop, a personal digital assistant (PDA), a fitness band, a tablet, a multimedia device, a GPS system, a camera, an MP3 player, a mobile game console, or any other similar functioning mobile device that includes tracking a location of the device.

Mobile device 10 includes a location service 20 that determines a location of the device. The location may be determined using any of GPS, cellular tower triangulation, and WiFi network location mapping. On a smart phone, for example, the location service 20 may be a component within the mobile OS. The location service 20 may report the determined location to other applications functioning on the mobile device 10. Such applications may include a location tracking application 30. For example, an OS may report a location of the device in latitude and longitude to the application 30 along with an estimated accuracy for the determined location. The estimated accuracy may indicate a degree of confidence of the determine location by indicating that the location is within a certain number of meters. For example, a latitude and longitude may be given with a 50 meter estimate precision. Additionally, the location service 20 may provide an indication about which source was used to determine the location. For example, the location may be provided with an indication that GPS information was used to obtain the location of the device.

The mobile device 10 also includes a location tracking application 30 that tracks a location of the mobile device 10 based on information provided to it by the location service 20 and communicates the location of the mobile device to a remote web server 40. The aspects presented herein can be applied to any application that includes features relating to a location of the mobile device. One example application 30 is a location based messaging application, as described in application Ser. No. 14/145,391, filed on Dec. 31, 2013, titled "System and Method for Anonymous Delivery of Geographically Specific Rich Media Information," the entire contents of which are incorporated by reference herein. The application may be configured to send location-based messages to the device. These messages may be emergency alerts, weather alerts, store coupons, or other messages that are pertinent to the current location of the mobile device.

In one aspect, the identity of the owner of the smart phone may never be known to the system. The application may function without requiring the user to provide a username. The user may never be required to enter an email address or phone number. The system might not collect the phone Unique Device Identifier (UDID). The mobile device may allow a user to enable/disable location services on the phone.

When a mobile device user downloads and installs on the mobile device an application that involves tracking a location of the device, the application may register the mobile device with the web service. The web service may assign an anonymous token as the system identifier for the mobile device. The web service stores the anonymous token as well as the location of the token in a location database, e.g., 50. Periodically, the application on the smart phone device checks in to update the location in the location database of the web service, by sending an updated location to web server 40. The application may be configured to register for location updates regarding the mobile device and to allow the application on the mobile device to determine when to send the location updates.

Thus, a location based application 30 may be downloaded and installed on a mobile device 10. The application user may, for example, register with the mobile device OS to receive update location information from the operating system. The application may then use the updated location information from the mobile device OS to send an updated device location to a web server 40. The web server 40 may record the location of the device and use the location to provide the service related to the application. In the example of a location based messaging application, the web server may use the location to send location-based messages to the device.

The location of the mobile device may be stored by the web server 40 at a location database 50. The location of the mobile device may be communicated to the web server 40 wirelessly as the mobile device travels, e.g., via a wireless network, including internet and/or cellular.

Figure 2:
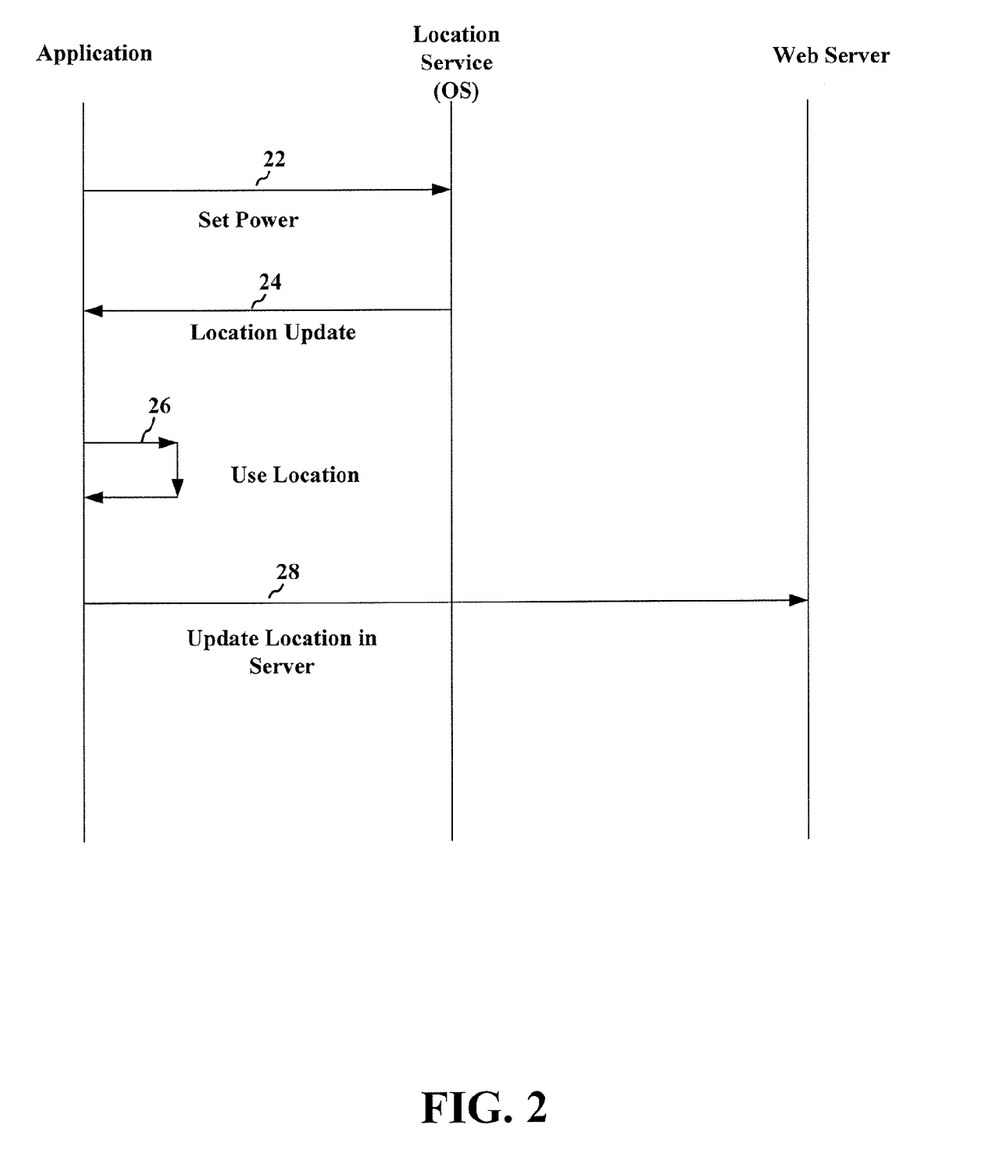
FIG. 2 is a flow diagram that illustrates example aspects of the flow of information within the system of FIG. 1, in accordance with aspects of the present disclosure.

FIG. 2 illustrates an example conceptual data flow of information between the components in the system of FIG. 1. As described above, the application in FIG. 2 may be a smart device application that relies on location tracking. The location service 20 may be a component of the OS of the mobile device. The web server is a remote server 40 that relies on location updates from the application in order to provide information or a service to the mobile device, e.g., via application 30. Initially, at 22, the application communicates a level or power of location monitoring to the location service of the mobile device. This level may be selected by a user, for example. Then, the location service informs the application of location updates, e.g., determined using any of GPS, WiFi, and cellular tower triangulation, along with an accuracy level of the determined location, at 24. At 26, the application determines whether to report the updated location that it has received from the location service to a web server 40 that is remotely storing a location of the mobile device. When a determination is made at 26 to send an updated location to the web server, the application wirelessly transmits the updated location that it received from the location service to the remote web server at 28.

The updated locations provided by the location service, e.g., of a mobile OS, can vary widely in the degree of accuracy of the location. Thus, the mobile OS indicates a degree of precision along with the location update. This degree of precision may be in the form of a number of meters within which the location is accurate. At times, the mobile operating system recognizes that the location update may be inaccurate and provides a large value to the accuracy component of the location update. Other times, the mobile operating system believes the location to be accurate, even when it is not. For example, mobile operating systems have been observed to give location updates judged to be very accurate placing the device in Massachusetts, then Texas, and then back Massachusetts in under 10 minutes. A mobile device travelling from Massachusetts to Texas then back to Massachusetts in fewer than 10 minutes is physically impossible.

The updated locations provided by the mobile operating system may also go from accurate locations to locations with a high degree of inaccuracy. If the device is not moving, the mobile application does not need to listen for updated locations. The goal of the mobile application may be to minimize the number of location updates received from the mobile operating system, and to limit communication of such location updates to the remote web server to circumstances when the location is a new and accurate location.

Aspects presented herein minimize battery usage by the application and yet maximize the accuracy of the device location. Aspects include using an adaptive, self-learning algorithm to maintain accurate location tracking at a web server while reducing the battery usage on the mobile device due to the location tracking.

Figure 3:
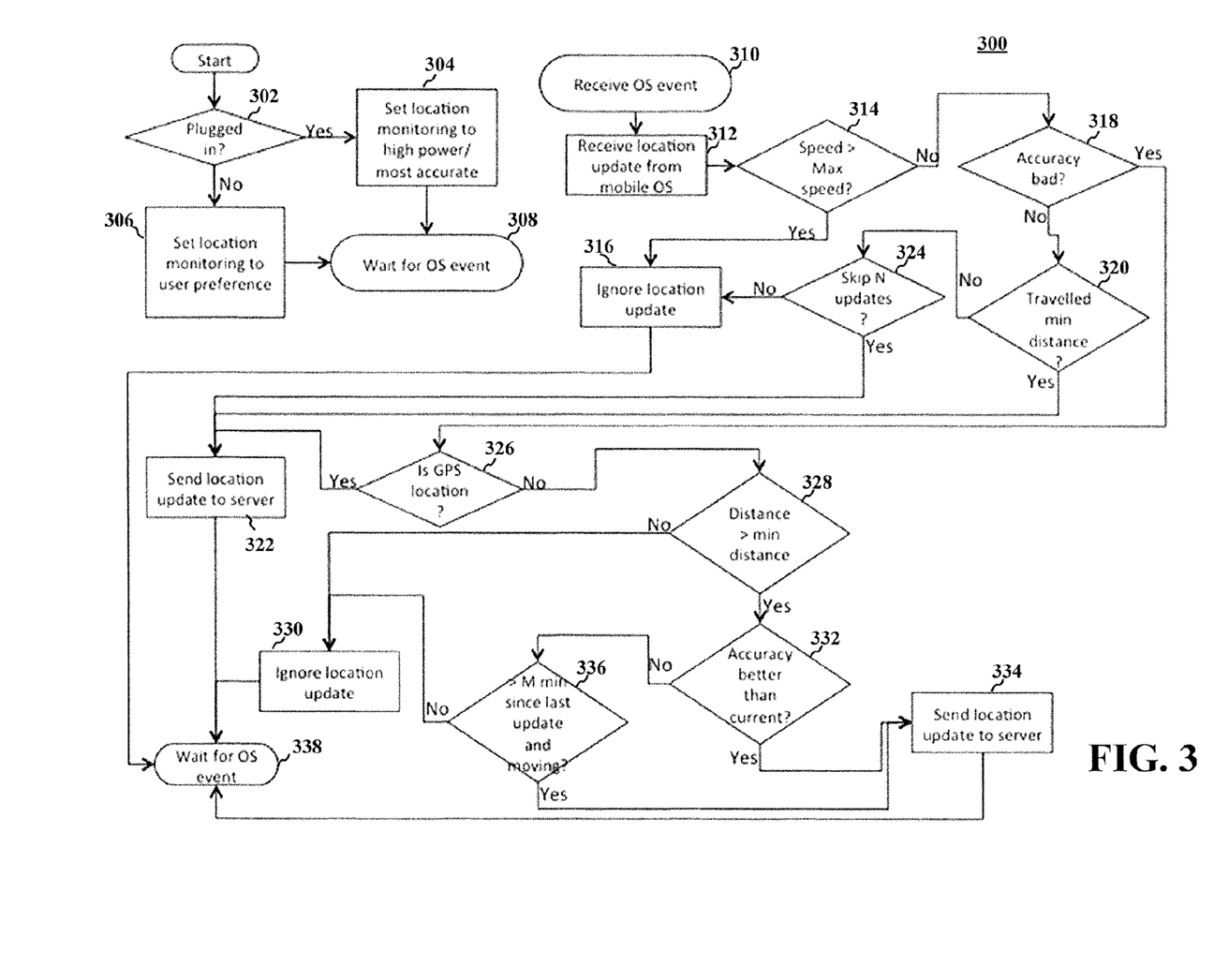
FIG. 3 illustrates a flow chart of an example method of optimizing battery use in a mobile device while tracking a location of the device, in accordance with aspects of the present disclosure.

FIG. 3 illustrates a flow chart of an example method 300 of determining when to report a location to a web server. At 302, the application may determine whether the mobile device is plugged in or otherwise connected to a power source other than its battery. If the mobile device is plugged in, the application may set location monitoring to a high level, e.g., to its most accurate level, at 304. If the application determines that the mobile device is not plugged in and is relying solely on its battery for power, the application may set the location monitoring to a user preferred level at 306. The user preferred level may comprise a level of somewhat reduced accuracy or a level that optimizes battery usage. Then, the application waits for a report of the location from the location service, e.g., 20, of the mobile device at 308. For example, the application may wait for an OS event that informs it of the mobile device's location.

When an OS event occurs at 310, e.g., informing the application of a determined location of the mobile device at 312, the application determines at 314 whether the new location update requires that the mobile device had travelled with a speed that is greater than a maximum speed. The maximum speed may be set as a predetermined value. For example, the maximum speed may be a preconfigured amount that is preset or hard coded in the application. The maximum speed may be approximately in the range of over 100 miles per hour, for example, 150 miles per hour. If the new location update requires that the device had travelled with a speed that is greater than a configured maximum speed, the location update may be ignored at 316.

If the new location update does not require that the device travelled at a speed greater than the maximum speed, the application considers the accuracy of the updated location at 318. For example, the application may consider the indicated accuracy of the location, as provided by the OS. For example, if the accuracy is within approximately 100 meters, the accuracy may be considered acceptable at 318, whereas if the accuracy is outside of 1000 meters, the accuracy may be considered bad at 318.

For example, the accuracy may be considered unacceptable if it is below a predetermined minimum accuracy. As another example, if the accuracy of the location update is less than the current accuracy, the location update may be ignored, whereas, if the accuracy of the updated location is greater than the accuracy of the current location, the application may further consider a minimum distance at 320.

If the accuracy is determined to be acceptable at 318, or to be more accurate than the current accuracy, the application considers at 320, whether the device has moved a significant amount. For example, the minimum distance may be a preconfigured amount that is preset or hard coded in the application. The minimum distance may be approximately in the range of 100 to 400 meters, for example, 150 meters.

If the application determines at 320 that the updated location indicates that the device has moved more than the minimum distance at 320, the application may send the updated location at 322 to the web server, e.g., 40 in FIG. 1. If the application determines at 320 that the updated location does not indicate that the mobile device has moved more than the minimum distance, the application determines at 324 the number of updated locations that have been ignored and not reported to the web server. If the application determines that a predetermined number, N, of location updates that the application received from the OS have been ignored, the application sends the updated location to the web server at 322. Otherwise, the application ignores the location update at 316.

If the application determines at 318 that the accuracy of the location update is not within an acceptable level, the application considers the source of the updated location at 326. If the source of the updated location is considered to be a reliable source, the application sends the location update to the web server at 322. For example, the location service may indicate the source of the determined location when it reports the updated location to the application, e.g., whether the updated location is based on information from the GPS chip, cell phone tower triangulation, or WiFi network location mapping. GPS locations are typically very reliable. Thus, as one example, if the location service indicates that the updated location is based on GPS information, or is a GPS determined location, the application may send the location update to the web server at 322.

In this example, if the updated location is not based on GPS, or another source that is considered to be reliable, the application considers at 328 whether the updated location indicates that the mobile device has moved more than a minimum distance. The minimum distance at 328 may be the same as the minimum distance considered at 320, or may be selected to be a different distance. For example, this minimum distance may be a preconfigured amount that is preset or hard coded in the application. This minimum distance may be approximately in the range of 100 to 400 meters, for example, 150 meters. If the updated location indicates that the mobile device has not moved at least this minimum distance, the application ignores the location update at 330. If the updated location indicates that the mobile device has moved at least the minimum distance, the application then considers whether the accuracy of the updated location is better or at a higher level of accuracy than the current location at 332. For example, the application may compare the number of meters of precision indicated by the location service for the location last reported to the web server to the number of meters of precision indicated for the updated location.

For example, if the current location, e.g., the location last reported to the web server, had an accuracy of 50 meters attached to it by the location service and the updated location has an accuracy of 100 meters attached to it by the location service, the updated location will not be considered more accurate than the current location.

If the updated location is more accurate than the location last sent to the web server, the application may communicate the updated location to the web server at 334.

If the updated location is not more accurate than the location last sent to the web server, the application then considers the length of time since the last location was sent to the web server at 336. For example, the application may have a set value M that is the maximum amount of time from the time that the last location update was reported to the web server until the application should send a new location update to the web server. For example, this value M may be a preconfigured amount that is preset or hard coded in the application. This maximum amount of time, M, may be approximately in the range of 5 to 30 minutes, for example, 8 minutes.

As an example, if the last location reported to the web server was greater than M, the updated location may be reported to the web server at 334. Otherwise, the application may ignore the location update at 330.

As illustrated in FIG. 3, at 336, the application may consider both the amount of elapsed time and whether the updated location indicates that the mobile device is moving. If the elapsed time since the last location was reported to the web server is at least M and if the updated location indicates that the mobile device is moving, the location may be reported to the web server at 334. If either the elapsed time is less than M or the device is not moving, the location update may be ignored at 330.

As an alternative to considering the amount of time, the application may consider the number of updated locations that have been ignored by the application and not sent to the web server. For example, after a certain number of previously ignored updates, the updated location will be sent to the web server even if the accuracy is determined to be less accurate than the current location at 332.

Once the application has either determined to send a location update to the web server at 322 or 334 or to ignore the location update at 316 or 334, the application returns to waiting for an OS event at 338, such as receiving an updated location from the location service.

As described above, values for the maximum speed, an acceptable accuracy level, N, minimum distance, and M in connection with FIG. 3 may be preset values that are hard coded into the program code of the application. In another example, the application may self tune these values to adjust the values to minimize battery usage and/or optimize accuracy.

Thus, when the application receives a location update for the same location, the location update may be ignored. Additionally, the application may ignore location updates until the device has moved a significant amount. The application receives the location updates, e.g., from the OS and processes them through an algorithm that may include the aspects illustrated in FIG. 3 in order to determine the need to update the web server with this location update.

The algorithm may examine any of a number of aspects of the location update including the new location, the distance travelled, the accuracy of the update, and how long it has been since the mobile app updated the server with the mobile device location. The device may instruct the OS Location Service to not provide any updates unless the position of the device has changed more than a minimum distance. If the OS Location Service does provide an update, if the mobile device has not travelled a minimum distance, then the update may be ignored unless many (e.g., more than N) updates have been ignored. If N previous updates have been ignored, this new location may be sent to the server. If the location update had a poor accuracy, but the location originated from the GPS chip on the mobile device, the location may be sent to the server. If the location had poor accuracy but did not come from the GPS, if the distance travelled is farther than a minimum threshold and the accuracy is better than the current accuracy, the location update may be used. If the accuracy is worse than the current accuracy but it has been longer than M minutes since the last location update and the device is in motion, than the location may be sent to the server. If the location is not GPS and the distance travelled is less than the minimum threshold, or it has not been longer than M minutes or the phone is not moving, then the location update may be ignored.

Aspects described herein minimize the location updates from the mobile operating system when the device is not in motion and when the device location has not changed by a minimum amount. When the device is in motion, the algorithm limits the number of location updates sent to the server while still providing updates to the web server with the more accurate mobile device locations.

This results in significantly reduced battery usage by the mobile device while providing accurate tracking of the location of the mobile device at a remote web server.

Figure 4:
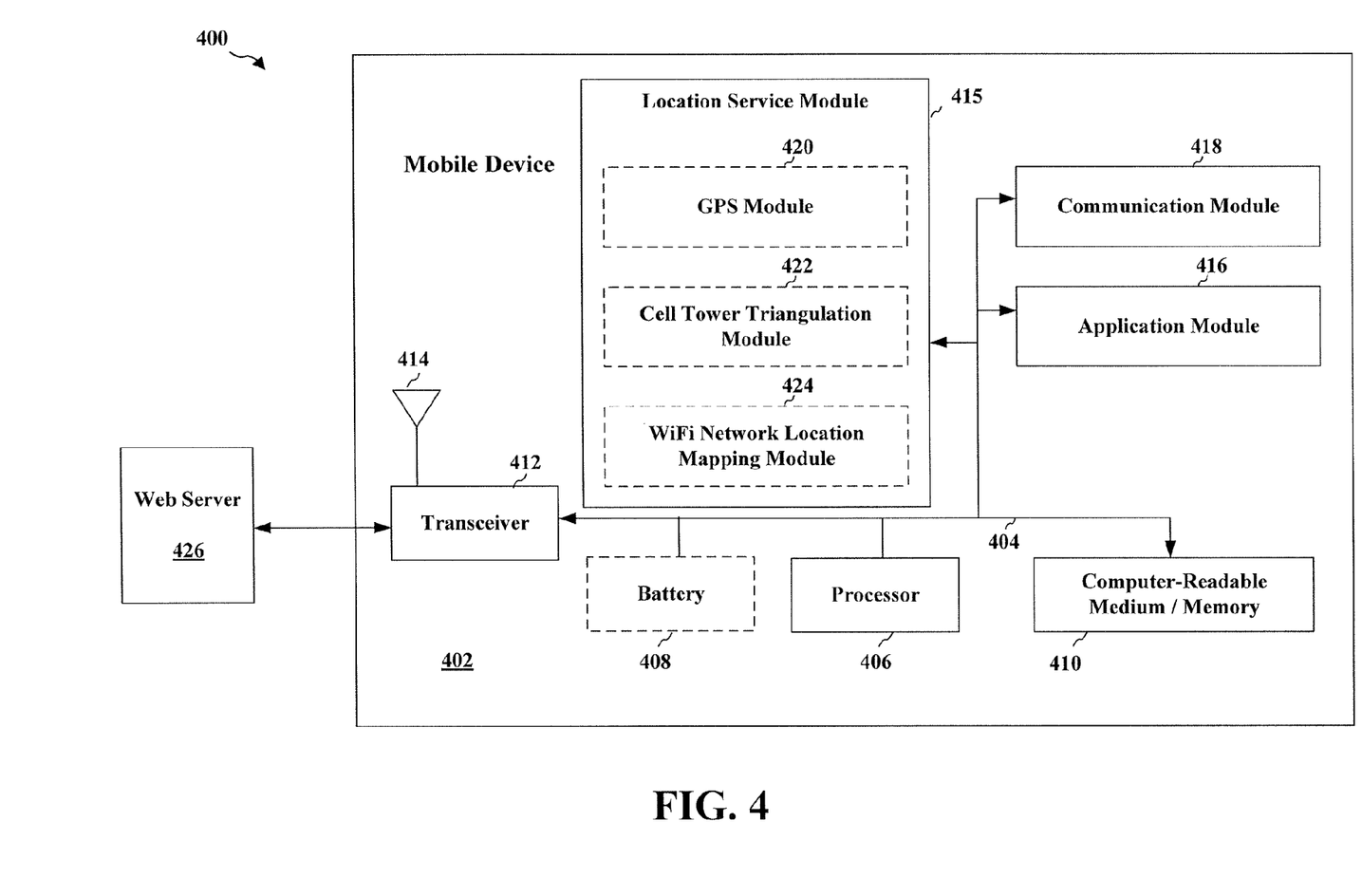
FIG. 4 illustrates components of an example mobile device, in accordance with aspects of the present disclosure.

FIG. 4 is a diagram 400 illustrating example aspects of a hardware implementation of a mobile device 402 employing a processing system.

Such a processing system may comprise various circuits including one or more processors and/or modules, represented by the processor 406, the modules 415, 416, 418, 420, 422, and 424, computer-readable medium/memory 410, and battery 408, linked to each other by a bus 404. The bus 402 may link various other circuits which are not described in detail.

The mobile apparatus may comprise a transceiver 412 coupled to the processing system. The transceiver 412 may be coupled to one or more antennas 414 in order to provide a means for communicating with various other apparatus over a transmission medium. For example, the transceiver may be used to transmit the updated location, as determined by application 416 to a remote web server 426. Such communication may be performed wirelessly, such as using a cellular network and WiFi, among others. The transceiver 412 may be configured to both receive and process signals, e.g., including signals from a web server such as 426, and to provide information from the signal to the processing system, e.g., to communication module. Communication module 418 may then provide the information to the application module or to another application module.

Processor 406 may be configured for general processing, including the execution of software stored on the computer-readable medium/memory 410. Such software, when executed by the processor 406, may cause the processing system to perform the various functions described supra. The processing system further includes at least one of the modules 415, 416, 418, 420, 422, and 424. For example, the location service module 415 may be a component of the OS of the mobile device 402. The location service module may include any of a GPS module, a cellular tower triangulation module 422, and a WiFi network location mapping module 424 in order to determine location updates that can be communicated to application module 416, as described supra. The modules may be software modules running in the processor 406, resident/stored in the computer readable medium/memory 410, one or more hardware modules coupled to the processor 406, or some combination thereof. In one example, mobile device may be a smart phone or other smart device.

In one configuration, the mobile device 402 includes means for registering at a location tracking application to receive location updates from the mobile device, means for receiving a location update from the mobile device, and means for determining at the mobile device whether to transmit location information from the received location update to a remote web server. The aforementioned means may comprise one or more of the aforementioned modules of the mobile device 402 and/or the processing system of the mobile device configured to perform the functions recited by the aforementioned means.

Figure 5:
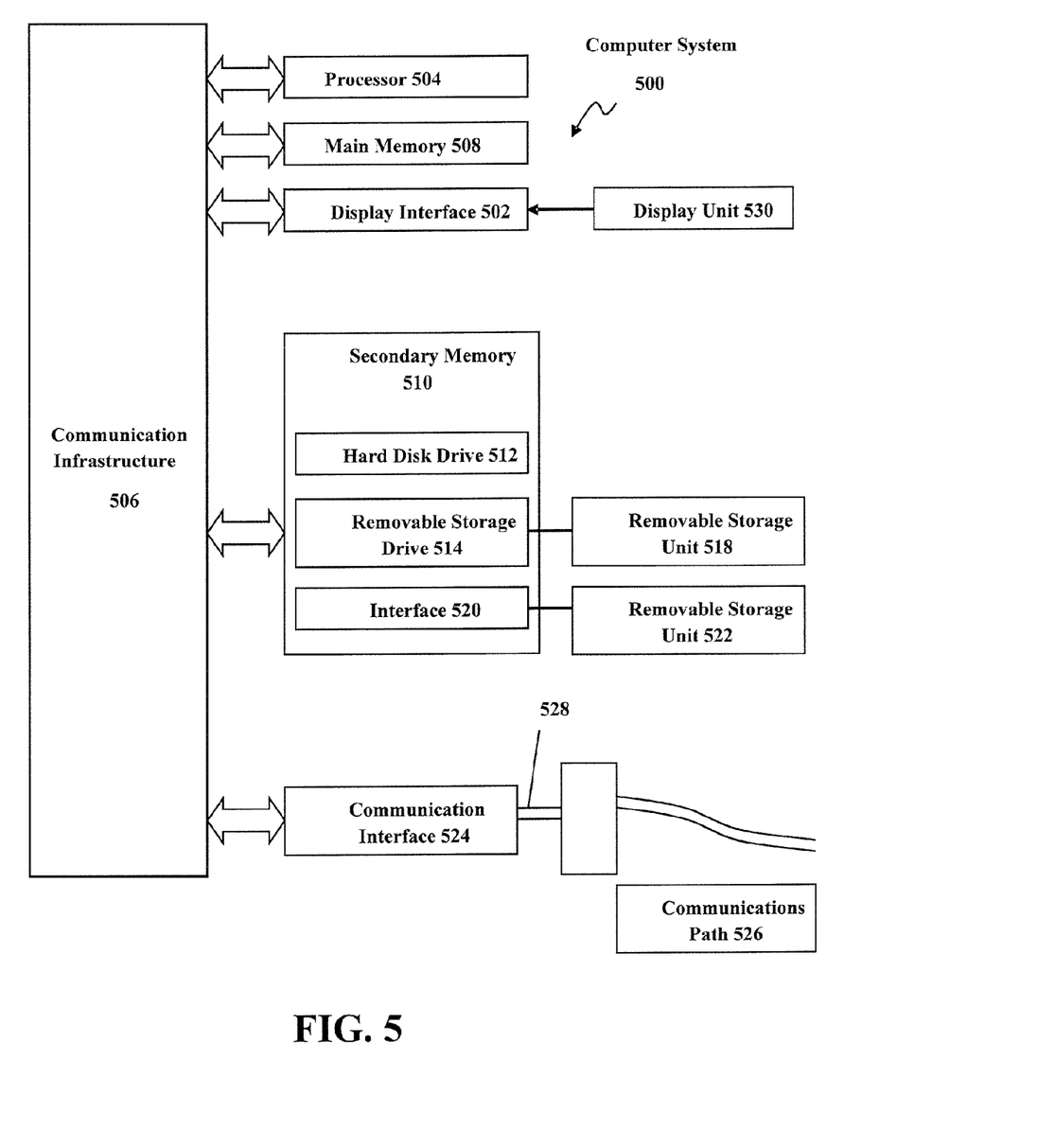
FIG. 5 illustrates an example system diagram of various hardware components and other features, for use in accordance with aspects of the present disclosure.

FIG. 5 presents an example system diagram of various hardware components and other features, for use in accordance with aspects presented herein. The aspects may be implemented using hardware, software, or a combination thereof and may be implemented in one or more computer systems or other processing systems. In one example, the aspects may include one or more computer systems capable of carrying out the functionality described herein. An example of such a computer system 500 is shown in FIG. 5.

Computer system 500 includes one or more processors, such as processor 504. The processor 504 is connected to a communication infrastructure 506 (e.g., a communications bus, cross-over bar, or network). Various software aspects are described in terms of this example computer system. After reading this description, it will become apparent to a person skilled in the relevant art(s) how to implement the aspects presented herein using other computer systems and/or architectures.

Computer system 500 can include a display interface 502 that forwards graphics, text, and other data from the communication infrastructure 506 (or from a frame buffer not shown) for display on a display unit 530. Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc., which is read by and written to removable storage drive 514. As will be appreciated, the removable storage unit 518 includes a computer usable storage medium having stored therein computer software and/or data.

In alternative aspects, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 980, a hard disk installed in hard disk drive 970, and signals 528. These computer program products provide software to the computer system 500. Aspects presented herein may include such computer program products.

Computer programs (also referred to as computer control logic) are stored in main memory 508 and/or secondary memory 510. Computer programs may also be received via communications interface 524. Such computer programs, when executed, enable the computer system 500 to perform the features presented herein, as discussed herein. In particular, the computer programs, when executed, enable the processor 510 to perform the features presented herein. Accordingly, such computer programs represent controllers of the computer system 500.

In aspects implemented using software, the software may be stored in a computer program product and loaded into computer system 500 using removable storage drive 514, hard drive 512, or communications interface 520. The control logic (software), when executed by the processor 504, causes the processor 504 to perform the functions as described herein.

In another example, aspects may be implemented primarily in hardware using, for example, hardware components, such as application specific integrated circuits (ASICs). Implementation of the hardware state machine so as to perform the functions described herein will be apparent to persons skilled in the relevant art(s).

In yet another example, aspects presented herein may be implemented using a combination of both hardware and software.

Figure 6:
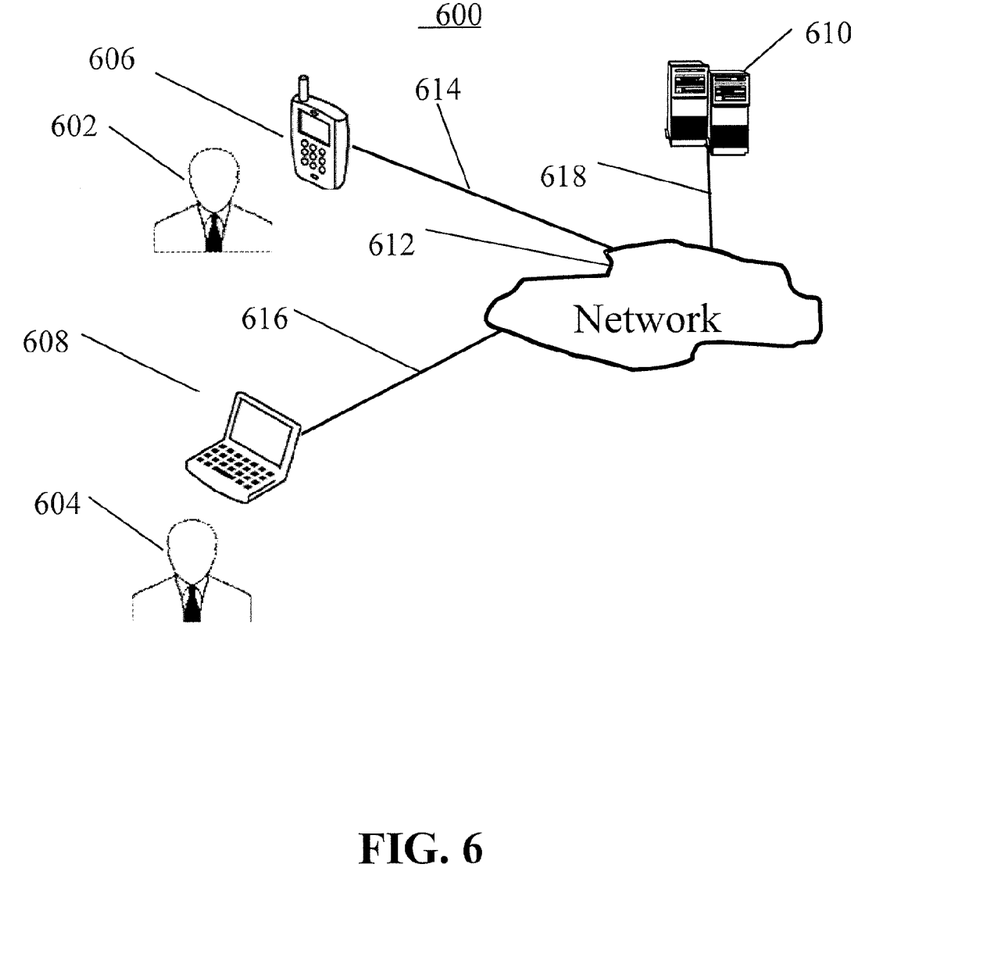
FIG. 6 illustrates a block diagram of various example system components, in accordance with aspects of the present disclosure.

FIG. 6 is a block diagram of various example system components, in an example communication system 600 usable in accordance with aspects presented herein. The communication system 600 includes one or more accessors 602 and 604 (also referred to interchangeably herein as one or more "users") and one or more terminals 606, 608. In one aspect, data for use in accordance aspects presented herein, for example, may be input and/or accessed by accessors 602, 604 via terminals 606, 608, such as telephonic devices, smart devices, wireless devices, such as personal digital assistants ("PDAs") or a hand-held wireless devices coupled to a server 610, such as a PC, minicomputer, mainframe computer, microcomputer, or other device having a processor and a repository for data and/or connection to a repository for data, via, for example, a network 612, such as the Internet or an intranet, and couplings 614, 616, and 618. The couplings 614, 616, and 618 may include, for example, wired, wireless, or fiberoptic links. For example, a wireless coupling may comprise a cellular communication link (3G, 4G, LTE or future cellular protocol) or WiFi connection.

Example aspects of the present invention have now been described in accordance with the above advantages. It will be appreciated that these examples are merely illustrative of aspects of the present invention. Many variations and modifications will be apparent to those skilled in the art.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of reducing battery consumption while tracking a location of a mobile device, comprising:
   registering at a location tracking application to receive location updates from the mobile device;
   receiving a location update from the mobile device; and
   determining at the mobile device whether to transmit location information from the received location update to a remote web server, including:
      determining whether an accuracy level of the received location update is at least an acceptable accuracy level, wherein if the accuracy of the received location update is at least the acceptable accuracy level, updated location information is sent to the remote web server,
      determining whether the received location update indicates that the mobile device has travelled at least a minimum distance when the accuracy of the received location update is below the acceptable accuracy level, wherein when the received location update indicates that the mobile device has travelled at least a minimum distance updated location information is sent to the remote web server.

2. The method of claim 1, wherein determining whether to transmit location information to the remote web server comprises:
   determining a level of location monitoring to be applied.

3. The method of claim 1, wherein determining whether to transmit location information to the remote web server comprises:
   determining whether the received location update indicates that the mobile device has traveled more than a maximum speed since a previous location update,
   wherein when the received location update indicates that the mobile device has travelled more than a maximum speed since a previous location update, updated location information is not sent to the remote web server.

4. The method of claim 1, wherein when the received location update indicates that the mobile device has not travelled at least the minimum distance a determination is made as to whether a number of received location updates that have not been forwarded to the remote web server is at least a predetermined number N,
   when the number of received location updates that have not been forwarded to the remote web server is at least N, updated location information is sent to the remote web server, and
   when the number of received location updates that have not been forwarded to the remote web server is less than N, updated location information is not sent to the remote web server.

5. The method of claim 1, wherein when the accuracy of the received location update is below the acceptable accuracy level, determining whether to transmit location information to the remote web server further comprises:
   determining a source of the location in the received location update, wherein if the source of the location is a Global Positioning System (GPS) module of the mobile device, updated location information is sent to the remote web server.

6. The method of claim 5, wherein when the source of the location is not the GPS module of the mobile device, determining whether to transmit location information to the remote web server further comprises:
   determining whether the received location update indicates that the mobile device has travelled at least a second minimum distance since a previous location update,
   wherein when the received location update does not indicate that the mobile device has travelled at least the second minimum distance since the previous location update, updated location information is not sent to the remote web server.

7. The method of claim 6, wherein when the received location update indicates that the mobile device has travelled at least the second minimum distance since the previous location update, determining whether to transmit location information to the remote web server further comprises:
   determining whether the accuracy of the received location update is greater than that of the location information last reported to the remote web server,
   wherein if the accuracy of the received location update is greater than that of the location information last reported to the remote web server, updated location information is sent to the remote web server.

8. The method of claim 7, wherein if the accuracy of the received location update is not greater than that of the location information last reported to the remote web server, determining whether to transmit location information to the remote web server further comprises:
  determining whether an amount of time since the location information was last reported to the web server is at least a predetermined amount of time,
  wherein if the amount of time since the location information was last reported to the web server is at least the predetermined amount of time, updated location information is sent to the remote web server; and
  wherein if the amount of time since the location information was last reported to the web server is not at least the predetermined amount of time, updated location information is not sent to the remote web server.

9. The method of claim 1, wherein when it is determined to transmit location information from the received location update to a remote web server, the location information is transmitted using an anonymous token to identify the mobile device.

10. A mobile device having reduced battery consumption while tracking a location of a mobile device, comprising:
  a memory; and
  at least one processor coupled to the memory and configured to:
    register to receive location updates from the mobile device;
    receive a location update from the mobile device; and
    determine at the mobile device whether to transmit location information from the received location update to a remote web server, including:
      determining whether an accuracy level of the received location update is at least an acceptable accuracy level, wherein the at least one processor is configured to send updated location information to the remote web server when the accuracy of the received location update is at least the acceptable accuracy level,
      determining whether the received location update indicates that the mobile device has travelled at least a minimum distance when the accuracy of the received location update is below the acceptable accuracy level, wherein the at least one processor is configured to send updated location information to the remote web server when the received location update indicates that the mobile device has travelled at least a minimum distance.

11. The mobile device of claim 10, wherein when it is determined to transmit location information from the received location update to a remote web server, the location information is transmitted using an anonymous token to identify the mobile device.

12. A computer program product for reducing battery consumption while tracking a location of a mobile device, comprising:
  a non-transitory computer-readable medium comprising code for:
    registering at a location tracking application to receive location updates from the mobile device;
    receiving a location update from the mobile device; and
    determining at the mobile device whether to transmit location information from the received location update to a remote web server, including:
      determining whether an accuracy level of the received location update is at least an acceptable accuracy level, wherein the updated location information is sent to the remote web server when the accuracy of the received location update is at least the acceptable accuracy level,
      determining whether the received location update indicates that the mobile device has travelled at least a minimum distance when the accuracy of the received location update is below the acceptable accuracy level, wherein the updated location information is sent to the remote web server when the received location update indicates that the mobile device has travelled at least a minimum distance.

13. The computer program product of claim 12, wherein determining whether to transmit location information to the remote web server comprises:
  determining whether the received location update indicates that the mobile device has travelled more than a maximum speed since a previous location update,
  wherein when the received location update indicates that the mobile device has travelled more than a maximum speed since a previous location update, updated location information is not sent to the remote web server.

14. The computer program product of claim 12, wherein when the received location update indicates that the mobile device has not travelled at least the minimum distance a determination is made whether a number of received location updates that have not been forwarded to the remote web server is at least a predetermined number N,
  when the number of received location updates that have not been forwarded to the remote web server is at least N, updated location information is sent to the remote web server, and
  when the number of received location updates that have not been forwarded to the remote web server is less than N, updated location information is not sent to the remote web server.

15. The computer program product of claim 12, wherein when the accuracy of the received location update is below the acceptable accuracy level, determining whether to transmit location information to the remote web server further comprises:
  determining a source of the location in the received location update, wherein if the source of the location is a Global Positioning System (GPS) module of the mobile device, updated location information is sent to the remote web server.

16. The computer program product of claim 14, wherein when the source of the location is not the GPS module of the mobile device, determining whether to transmit location information to the remote web server further comprises:
  determining whether the received location update indicates that the mobile device has travelled at least a second minimum distance since a previous location update,
  wherein when the received location update does not indicate that the mobile device has travelled at least the second minimum distance since the previous location update, updated location information is not sent to the remote web server.

17. The computer program product of claim 16, wherein when the received location update indicates that the mobile device has travelled at least the second minimum distance since the previous location update, determining whether to transmit location information to the remote web server further comprises:
  determining whether the accuracy of the received location update is greater than that of the location information last reported to the remote web server,
  wherein if the accuracy of the received location update is greater than that of the location information last reported to the remote web server, updated location information is sent to the remote web server.

18. The computer program product of claim 17, wherein if the accuracy of the received location update is not greater than that of the location information last reported to the remote web server, determining whether to transmit location information to the remote web server further comprises:
determining whether an amount of time since the location information was last reported to the web server is at least a predetermined amount of time,
wherein if the amount of time since the location information was last reported to the web server is at least the predetermined amount of time, updated location information is sent to the remote web server; and
wherein if the amount of time since the location information was last reported to the web server is not at least the predetermined amount of time, updated location information is not sent to the remote web server.

19. The computer program product of claim 12, wherein when it is determined to transmit location information from the received location update to a remote web server, the location information is transmitted using an anonymous token to identify the mobile device.

20. The mobile device of claim 10, wherein the at least one processor is further configured to determine a level of location monitoring to be applied.

21. The mobile device of claim 10, wherein the at least one processor is further configured to:
determine whether the received location update indicates that the mobile device has travelled more than a maximum speed since a previous location update; and
refrain from sending updated location information to the remote web server when the received location update indicates that the mobile device has travelled more than a maximum speed since a previous location update.

22. The mobile device of claim 10, wherein the at least one processor is further configured to:
determine whether a number of received location updates that have not been forwarded to the remote web server is at least a predetermined number N when the received location update indicates that the mobile device has not travelled at least the minimum distance;
send updated location information to the remote web server when the number of received location updates that have not been forwarded to the remote web server is at least N; and
refrain from sending updated location information to the remote web server when the number of received location updates that have not been forwarded to the remote web server is less than N.

23. The mobile device of claim 10, wherein the at least one processor is further configured to:
determine a source of the location in the received location update when the accuracy of the received location update is below the acceptable accuracy level; and
send updated location information to the remote web server when the source of the location is a Global Positioning System (GPS) module of the mobile device.

24. The mobile device of claim 23, wherein the at least one processor is further configured to:
determine whether the received location update indicates that the mobile device has travelled at least a second minimum distance since a previous location update when the source of the location is not the GPS module of the mobile device; and
refrain from sending updated location information to the remote web server when the received location update does not indicate that the mobile device has travelled at least the second minimum distance since the previous location update.

25. The mobile device of claim 24, wherein the at least one processor is further configured to:
determine whether the accuracy of the received location update is greater than that of the location information last reported to the remote web server when the received location update indicates that the mobile device has travelled at least the second minimum distance since the previous location update; and
send updated location information to the remote web server when the accuracy of the received location update is greater than that of the location information last reported to the remote web server.

26. The mobile device of claim 25, wherein the at least one processor is further configured to:
determine whether an amount of time since the location information was last reported to the web server is at least a predetermined amount of time when the accuracy of the received location update is not greater than that of the location information last reported to the remote web server;
send updated location information to the remote web server when the amount of time since the location information was last reported to the web server is at least the predetermined amount of time; and
refrain from sending updated location information to the remote web server when the amount of time since the location information was last reported to the web server is not at least the predetermined amount of time.

* * * * *